United States Patent Office 3,177,248
Patented Apr. 6, 1965

3,177,248
HALOCARBONYLSULFENYL HALIDES
Bernard Freedman, Richmond, Calif., assignor to California Research Corporation, San Francisco, Calif., a corporation of Delaware
No Drawing. Filed Nov. 2, 1962, Ser. No. 235,145
2 Claims. (Cl. 260—544)

This invention relates to halocarbonylsulfenyl halides and their method of preparation.

The compounds of this invention are halocarbonylsulfenyl halides having the following formula:

$$X\overset{O}{\underset{\|}{C}}SX$$

wherein X is halogen. The novel halocarbonylsulfenyl halides are versatile intermediates and may be used in the preparation of a wide variety of useful compounds.

The halocarbonylsulfenyl halides may be readily prepared by thermal dehalohydrocarbylation of hydrocarbyloxydihalomethanesulfenyl halide, wherein the hydrocarbyl group is free of unsaturation at the carbon bonded to the oxygen. That is, the carbon bonded to oxygen is a saturated aliphatic carbon. The hydrocarbyloxydihalomethanesulfenyl halide can be prepared, for example, by the halogenation of dihydrocarbylxanthate. The sequence of reactions is indicated by the following equations:

$$RO\overset{S}{\underset{\|}{C}}SR' + X_2 \longrightarrow ROCX_2SX + R'SX_3$$

$$ROCX_2SX \longrightarrow X\overset{O}{\underset{\|}{C}}SX + RX$$

wherein R and R' are hydrocarbyl and X is halogen.

The hydrocarbyl group may be any hydrocarbon which has an aliphatic carbon bonded to the oxygen. While most substituents, such as cyano, halo, nitro, etc., would not interfere with the preparation of applicant's novel compounds, since the hydrocarbyl group does not appear in the final compound, it is preferred to have a simple substituent. There is no purpose in having a hydrocarbyl group over 20 carbons. While aralkyl groups and cycloaliphatic groups are operable, it is preferred to have lower alkyl groups. That is, groups of from 1 to 6 carbons, with groups of from 1 to 4 carbons being particularly preferred, i.e., methyl, ethyl, propyl, isopropyl, butyl, sec.-butyl, isobutyl, tert.-butyl, etc.

While this invention is generic to halocarbonylsulfenyl halides, wherein the two halogens may be the same or different, the preferred compounds of this invention are those wherein halogen is of atomic number 17 to 35, i.e., chlorine and bromine.

The particularly preferred compound of this invention is chlorocarbonylsulfenyl chloride. The chloro compound is prepared by heating hydrocarbyloxydichloromethanesulfenyl chloride until the evolution of hydrocarbyl chloride occurs. Depending on the hydrocarbyl group, temperatures in excess of 40° C. are satisfactory. Usually, the temperatures will not exceed 200° C. and will preferably be in the range of 50 to 100° C. The hydrocarbyloxydichloromethanesulfenyl chloride is heated while increasing the temperature until the evolution of the hydrocarbyl chloride is noted. The temperature is then maintained until the evolution stops. With lower temperatures, greater time will be required prior to the occurrence of the evolution and the evolution will be slow.

It is preferred that the pyrolysis occurs at reduced pressures. In this way the hydrocarbylchloride is removed as it is formed. Under these conditions, it is necessary that the hydrocarbyl chloride have a lower boiling point than the chlorocarbonylsulfenyl chloride. Therefore, lower alkyl groups of from 1 to 4 carbons will usually be used as the hydrocarbyl group. The pressures may vary from about 75 mm. Hg to 500 mm. Hg. However, the particular pressure is one of expediency and is not critical to the successful operation of the process.

The dehalohydrocarbylation may be greatly accelerated with a wide variety of catalysts. When using a catalyst, room temperature or lower may be used, particularly temperatures in the range of −50° C. to 50° C. Preferably, the temperature will be in the range of −10° C. to 30° C.

A solvent may be used but is not essential to the reaction. Various solvents, such as ethers, chloroform, carbon disulfide, low boiling hydrocarbons, such as pentane and benzene, may be used, with carbon disulfide being the preferred solvent. The concentrations of reactants and catalysts in the solvent are not critical.

Catalysts which are effective in this reaction are those which catalyze the ionic halogenation of benzene, i.e., electrophilic substitution. See Chemistry of Carbon Compounds, E. H. Rodd, Elsevier Publishing Co., New York, vol. III$^A$, 1954, page 90. Illustrative of such catalysts are iodine and Lewis acids, such as antimony trichloride, antimony pentachloride, ferric chloride, aluminum chloride, mercuric chloride, cupric chloride, titanium trichloride, titanium tetrachloride, etc. The amount of catalyst will vary depending on the particular catalyst used, but will usually be in the range of from 0.1 to 2 mol percent based on the hydrocarbyloxydichloromethanesulfenyl chloride.

The chlorocarbonylsulfenyl chloride reacts slowly with water and hydroxylic solvents. However, even at room temperature after a period of time, the chlorocarbonylsulfenyl chloride will react, and to that degree the chlorocarbonylsulfenyl chloride should be protected from hydroxylic groups. At low temperatures (0° C.), the reaction is sufficiently slow to permit water as a reaction medium.

The other halo compounds of this invention, i.e., the fluoro, bromo and iodo analogs, may be prepared by the thermal dehalohydrocarbylation of the analogous hydrocarbyloxydihalomethanesulfenyl halide or by exchange with the readily prepared chlorocarbonylsulfenyl chloride. Various salts or hydrohalic acids may be used for the exchange.

The following examples are offered by way of illustration and are not intended to be limiting.

*Example I*

Into a vessel fitted for distillation was introduced 225 grams of ethoxydichloromethanesulfenyl chloride and heated to a temperature of 60 to 70° C., while maintaining a pressure of about 150 mm. of mercury. After several minutes, the compound began to vigorously boil releasing ethyl chloride. The reaction subsided within a few minutes and the product was then distilled over, yielding 90.6 grams of chlorocarbonylsulfenyl chloride boiling at 51 to 53° C. at 145 mm.

Analysis:

|  | Theory, percent | Found, percent |
|---|---|---|
| Cl | 54.1 | 54.7 |
| S | 24.5 | 25.5 |

*Example II*

Into a vessel containing 0.1 gram of ferric chloride in 25 ml. of carbon disulfide was added dropwise a solution containing 54 grams of methoxymethanedichlorosulfenyl chloride in 135 ml. of carbon disulfide. The reaction was spontaneous with the liberation of methyl chloride. The solution was added over a period of 45 minutes. Carbon disulfide was then removed under reduced pressure and the remaining material distilled, yielding 22.4 grams of chlorocarbonylsulfenyl chloride boiling at 52 to 57° C. at 140 to 150 mm. pressure.

As already indicated, the halocarbonylsulfenyl halides are reactive intermediates which can be used to prepare a wide variety of compounds which might otherwise be difficultly obtainable. By virtue of having two reactive functionalities, different groups may be attached to the carbonyl carbon and to the sulfur. Compounds, which have reactive or electron rich sites, such as on nitrogen, oxygen, sulfur, phosphorus and carbon, may be used to prepare new and interesting compounds.

*Example III*

To a flask containing 8.25 grams (0.13 mol) of ethyl mercaptan and 50 ml. of n-pentane, cooled to −18° C., was added dropwise a solution of 17.35 grams (0.13 mol) of chlorocarbonylsulfenyl chloride in 20 ml. of n-pentane. An immediate reaction took place. The addition was carried out over a period of one-half hour while the temperature was maintained at −10° C. Stirring was then continued for about fifteen minutes in the cold while suction was applied to the flask by means of a water aspirator. The clear solution was then added dropwise to another flask containing 28.4 grams (0.27 mol) of N-methylaniline, and 50 ml. of n-pentane cooled to 0° C. The temperature was maintained at between 0° to 5° C. during the addition. The mixture was allowed to stir overnight, after which time it was filtered to remove the salt and the residue washed with n-pentane. The filtrate was cooled in ice, and the solid, which crystallized out, was separated by filtration. After being dried in air, the solid melted at 52.0 to 53.5° C. and weighed 15.0 grams for a 50% yield of S-(ethylthio)-N-methyl-N-phenylthio carbamate.

Analysis:

|  | Theory, percent | Found, percent |
| --- | --- | --- |
| S | 28.2 | 28.50 |

The molecular weight was found to be 225.9 as compared to a calculated molecular weight of 227.3.

As is evident from the foregoing, applicant's novel intermediate may be used to prepare a wide variety of compounds, such as thiocarbamates, carbamoyldisulfides, thiocarbonates, etc., which find a wide variety of uses, such as solvents, pesticides, etc.

As will be evident to those skilled in the art, various modifications on this process can be made or followed, in the light of the foregoing disclosure and discussion, without departing from the spirit or scope of the disclosure or from the scope of the following claims.

I claim:
1. A compound of the formula

wherein X is halogen of an atomic number 17 to 35.
2. Chlorocarbonylsulfenyl chloride.

References Cited by the Examiner
FOREIGN PATENTS
538,146   3/57   Canada.

LEON ZITVER, *Primary Examiner.*